Nov. 5, 1957    F. L. GEARY ET AL    2,811,831
VARIABLE AREA NOZZLE
Original Filed June 29, 1951    3 Sheets-Sheet 2
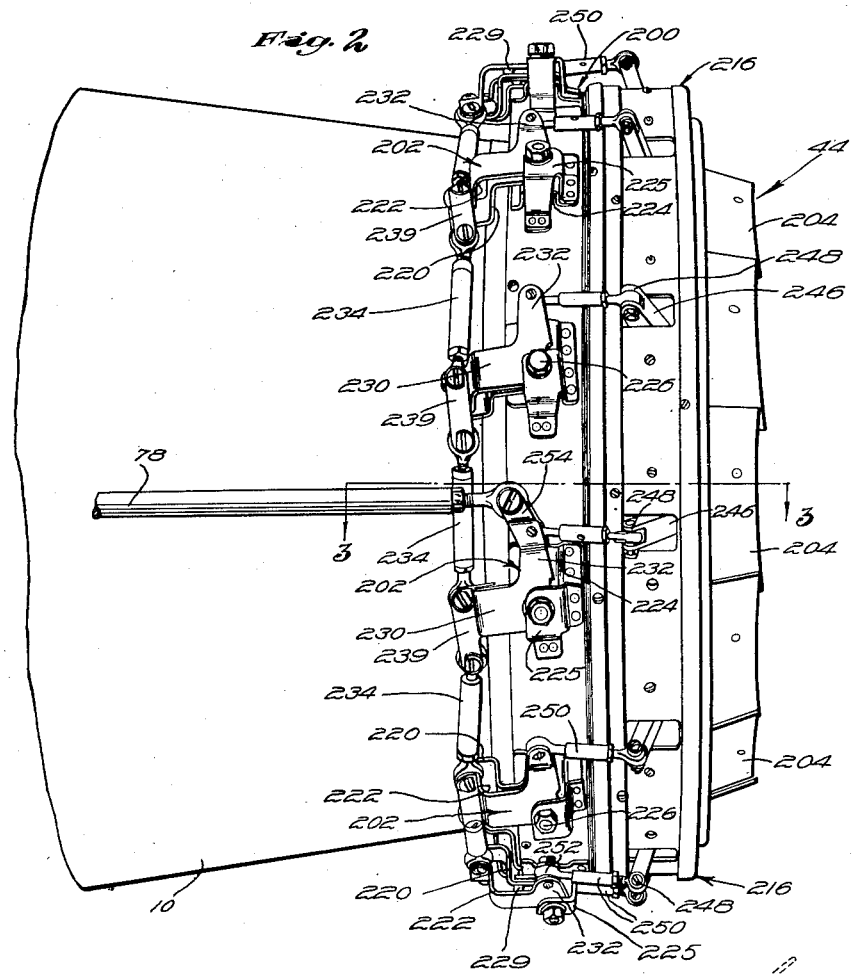
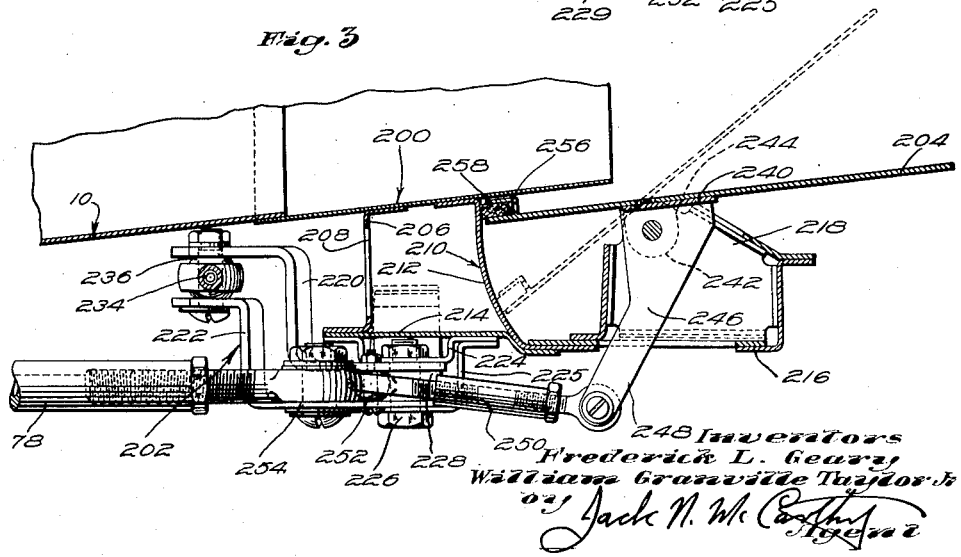

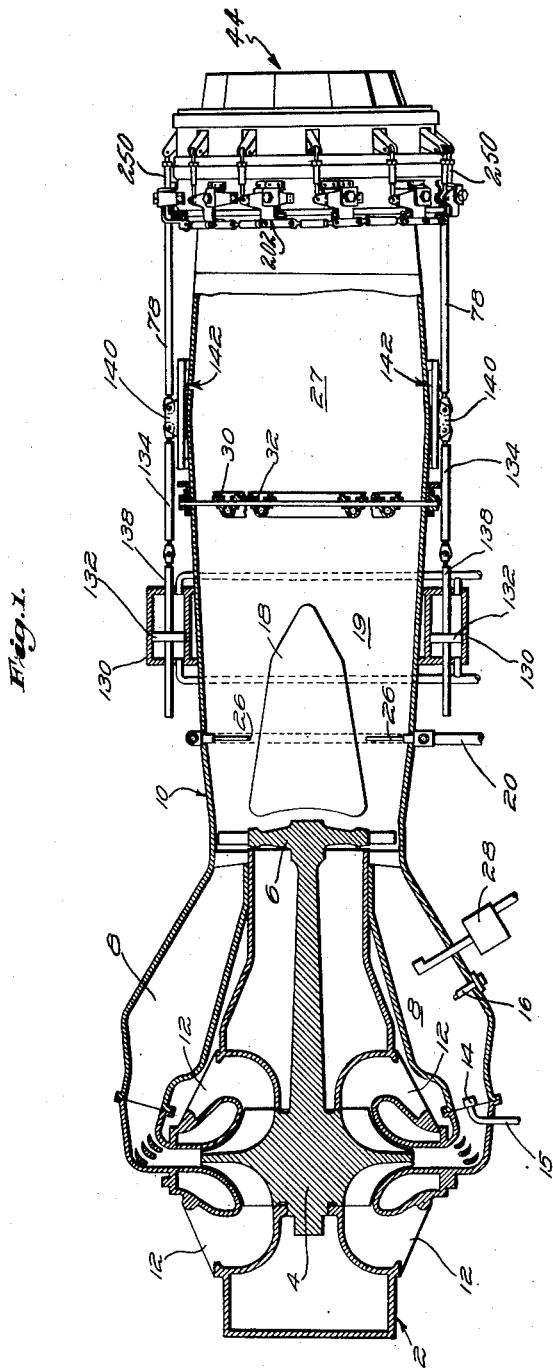

United States Patent Office 2,811,831
Patented Nov. 5, 1957

2,811,831

VARIABLE AREA NOZZLE

Frederick L. Geary, Springfield, Mass., and William Granville Taylor, Jr., South Glastonbury, Conn., assignors to United Aircraft Corporation, East Hartford, Conn., a corporation of Delaware Original application June 29, 1951, Serial No. 234,228. Divided and this application August 20, 1954, Serial No. 451,184

13 Claims. (Cl. 60—35.6)

This invention relates to a propelling nozzle for a turbojet engine and is a division of U. S. application Serial No. 234,228, filed June 29, 1951. Another division of the above-identified U. S. application being filed herewith is identified as U. S. application Serial No. 451,154.

An object of this invention is to provide a propelling nozzle of the type which can be positioned at any number of positions between two limits.

A further object is to provide a propelling nozzle which for each position of the nozzle will provide a substantially circular opening.

Another object is to provide a nozzle for a turbojet engine which can be opened and closed with a minimum load being placed on the actuating mechanism.

A further object is to provide a nozzle for an exhaust duct of a turbojet engine which for each position of the nozzle will provide an opening which is substantially in one plane perpendicular to the axis of the duct.

Another object is to provide a nozzle having a minimum of weight.

A further object is to provide a nozzle for an exhaust duct of a turbojet engine having an actuating mechanism which includes a series of bell crank levers pivotally mounted on said duct.

Fig. 1 is a diagrammatic view of a turbojet engine in partial cross section with the nozzle in elevation.

Fig. 2 is an enlarged view of the propelling nozzle.

Fig. 3 is an enlarged sectional view taken on the line 3—3 of Fig. 2.

Figure 4:
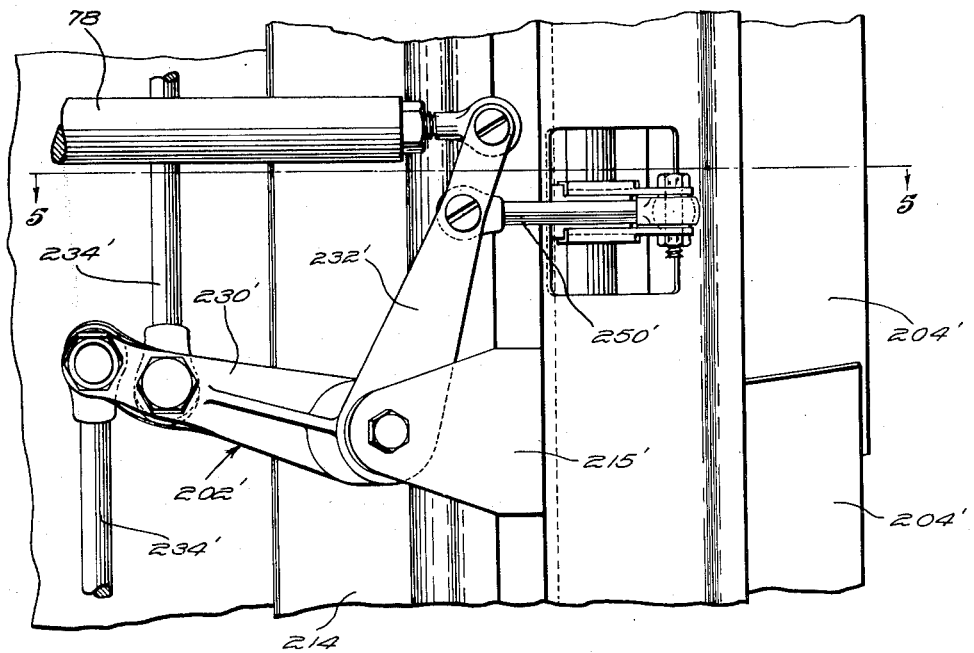
Fig. 4 is a fragmentary enlarged view similar to Fig. 2 of a modification of the propelling nozzle.

Referring to Fig. 1, the turbojet engine 2 has a compressor 4 which in the arrangement shown is a centrifugal type driven by a turbine 6. Combustion chambers 8 therebetween deliver air from the compressor to the turbine. An afterburner 10 is attached at the turbine outlet to provide a means of increasing the thrust.

The engine 2 has two axially spaced annular intake openings 12 to direct the incoming air into the two oppositely facing annular compressor inlets. Compressed air discharged from the compressor 4 passes to the turbine through the combustion chambers 8 where it is mixed with fuel from fuel nozzles 14. These fuel nozzles 14 receive fuel through conduit 15. The fuel-air mixture is initially ignited within the combustion chambers 8 by spark igniter 16.

From the turbine, the gases pass around a cone 18 into the diffuser section 19 of the afterburner. When the afterburner is operating, fuel from a conduit 20 is discharged into these gases through a plurality of fuel nozzles 26 located in the diffuser section 19. Since the gases leaving the turbine 6 contain a considerable amount of unburned oxygen, the additional fuel introduced by fuel nozzles 26 provides a combustible mixture which may be initially ignited within combustion chamber 27 by any suitable ignition means 28. The ignition means may be of the type shown and claimed in copending application Serial No. 196,402, filed November 18, 1950. The burning of this combustible mixture is stabilized in the afterburner combustion chamber 27 by flameholders 30 and 32. The burned gases discharge from the engine through the nozzle 44 whose area can be varied.

The nozzle 44 is the type which can be positioned at any number of positions between two limits. A nozzle actuating system similar to the one shown with this invention is shown and claimed in copending application Serial No. 193,734, filed November 2, 1950. The actuating system consists of the cylinder 130, piston 132, connecting actuating rod 134, nozzle actuating rod 78, piston rod 138, car 140, and track mechanism 142 for said car.

Referring to Fig. 2, the nozzle shown consists of three main parts, (1) the bell crank lever and flap supporting structure 200, (2) the bell crank levers 202 and (3) the flaps 204. These three parts are closely interconnected by linkages and pivots.

Referring to Fig. 3, the flap supporting structure 200 which is fixedly attached to the wall of the afterburner 10 consists of several parts. One part, a ring 206, having holes 208, is fixed to the wall of the afterburner adjacent the end and extends outwardly as a radial flange. A second ring 210 extends similarly from the afterburner and has a curved sealing portion 212 for a purpose to be described later. A third flat ring 214 extends around the afterburner in spaced relation to the wall thereof and is attached at its edges to the free ends of the two rings 206 and 210 and supports the bell crank levers 202. A fourth built-up ring 216 is fixed to and projects rearwardly from said sealing ring 210 and carries the mounting brackets 218 for the flaps.

The bell crank lever 202 consists of two members 220 and 222 similarly shaped which are placed one over the other and pivoted between two brackets 224 and 225 by a bolt 226. The brackets 224 and 225 are secured to the ring 214. A spacer 228 is located around the bolt 226 between the members 220 and 222. These bell crank levers are mounted in spaced relation to each other around the third ring 214. A spacer 229 is fixedly mounted between the members 220 and 222. Each bell crank lever has two lever arms 230 and 232. The arm 230 is offset downward at its free end and is connected to the corresponding arm 230 of each adjacent bell crank lever by links 234 having a self-aligning bearing on each end. Each link 234 has the ball member 236 of the self-aligning bearing of one end held between the free ends of the parts of the members 220 and 222 forming arm 230 of a bell crank lever and the ball member of the self-aligning bearing of the other end held between projections 239 extending from the free ends of the parts of the members 220 and 222 forming arm 230 of the adjacent bell crank lever.

Each of the flaps 204 has mounted thereon a bracket 240 having a boss 242 at each end which is placed between two bosses 244 on the mounting brackets 218 on the flap supporting structure 200. Also mounted on the flap is a built-up arm 246 which has a clevis 248 at its free end. An adjustable link 250 having a self-aligning bearing on each end is connected between the free end of each arm 232 of the bell crank levers 202 and the clevis of the built-up arm of the flap which it is to actuate. The link 250 has the ball member 252 of the self-aligning bearing at one end held between the ends of the parts of the members 220 and 222 forming arm 232 and the ball member of the self-aligning bearing at the other end held in the clevis 248 of the built-up arm 246 of the flap.

One of the bell crank levers on each side of the afterburner has an extension 254 on the arm 232 which permits the nozzle control rod 78 to be connected thereto to actuate the nozzle 44. A U-shaped member 256 is fixed on the end of the flap 204 which mates with the sealing portion of ring 210 and a sealing strip 258 is mounted in the member 256. Where adjacent flaps overlap this U-shaped member is located on the outer side with the holes to allow pressure from the afterburner to act against the sealing strip being located in the flap.

Figure 5:
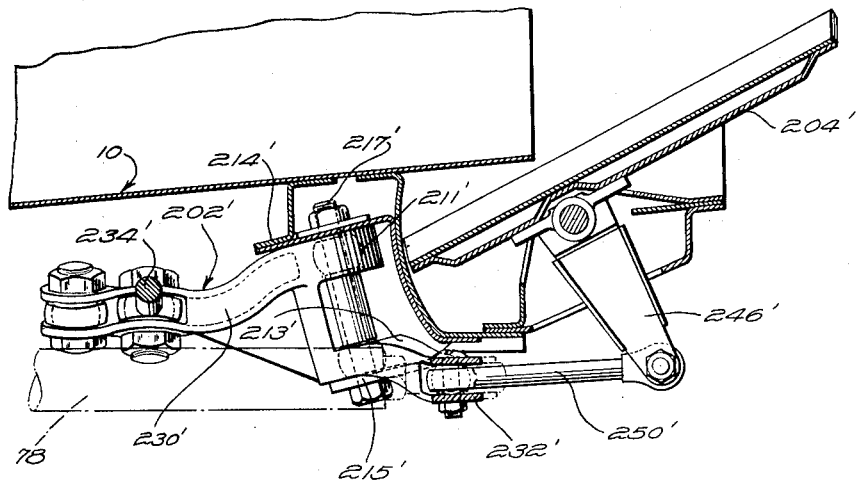
Fig. 5 is a view taken on the line 5—5 of Fig. 4.

A modification of this nozzle is shown in Figs. 4 and 5 having the same main parts. However, the bell crank lever 202' is of a different construction and is mounted at an angle to the centerline of the afterburner.

This bell crank lever 202' has two arms 230' and 232'. Arm 230' extends in a manner similar to arm 230 of the modification shown in Fig. 2, however, the links 234' are connected to the arm 230' adjacent each other at the end of the arm. This end of the arm is bifurcated and twisted so as to receive the ends of adjacent links 234' at different angles. Arm 232' extends in a manner similar to arm 232 of the modification shown in Fig. 2 and is connected to a built-up arm 246' on a flap 204' by a link 250' to actuate the flap. The center part of the bell crank lever 202' has two bosses, 211' and 213' each having a hole for pivotally mounting said lever between ring 214' and flange 215' by a bolt 217'. This pivotal mounting is arranged so that the axis of the bolt 217' is at an oblique angle to the centerline of the afterburner, the end of the bolt nearest the afterburner being located forward of the other end of the bolt. This arrangement maintains the distance between the free ends of adjacent levers 230' substantially constant as the bell crank levers are rotated.

Operation

Assuming the nozzle to be in the position shown in Fig. 2, when the nozzle control rods 78 are moved to the left, or forward (with respect to the afterburner), the bell crank levers 202 connected to said control rods are moved about their pivots with arms 230 moving the adjacent bell crank levers through links 234. Each other bell crank lever 202 is moved by its adjacent arm 230. The motion of the links is transferred to the flaps through links 250 and built-up arms 246. This pivoting of the flaps is in an opening direction thereby increasing the area of the exhaust nozzle. If the nozzle is to be closed, the nozzle control rods 78 are moved to the right, or rearwardly, and through a sequence of operation, the reverse of that described above, the flaps are moved in a closing direction.

Although specific embodiments have been shown and described herein for the purpose of illustration, it will be evident to those skilled in the art that the invention is capable of various modifications and adaptations within the scope of the appended claims. Other variable area nozzles of the multiple flap type are shown and claimed in copending application Serial No. 234,256, filed June 29, 1951, copending application Serial No. 284,511, filed April 26, 1952, now Patent No. 2,770,944, dated November 20, 1956, copending application Serial No. 316,911, filed October 25, 1952, and copending application Serial No. 316,912, filed October 25, 1952.

We claim:

1. A variable area nozzle including a duct having an outlet, a ring surrounding said duct adjacent to the outlet, a plurality of flaps pivotally mounted on said ring around said fluid outlet, and means for pivoting said flaps to vary the effective area of said outlet including a number of bell crank levers mounted on the duct, one lever for each flap, each lever being pivoted on a substantially radial axis, and each lever being connected to the adjacent flap.

2. A variable area nozzle including a duct having an outlet, a ring surrounding said duct adjacent to the outlet, a plurality of flaps pivotally mounted on said ring around said fluid outlet, each of said flaps having an arm projecting therefrom, and means for pivoting said flaps to vary the effective area of said outlet including a bell crank lever for each flap outlet each lever being mounted on an axis substantially radial with respect to the duct and being connected to the adjacent flap.

3. A variable area nozzle including a duct having an outlet, a ring surrounding said duct adjacent to the outlet, a plurality of flaps pivotally mounted on said ring around said fluid outlet, each of said flaps having an arm projecting therefrom, means for pivoting said flaps to vary the effective area of said outlet including a bell crank lever for each flap, a link connecting each flap arm of each flap to the adjacent lever, and means connecting said levers together to cause simultaneous movement of all the flaps.

4. A variable area nozzle including a duct having an outlet, a ring surrounding said duct adjacent to the outlet, a plurality of flaps pivotally mounted on said ring around said fluid outlet, said ring having a sealing portion, said flaps each having a part engaging with said sealing portion to form a seal, each of said flaps having an arm projecting therefrom, means for pivoting said flaps to vary the effective area of said outlet including a bell crank lever for each flap, and a link connecting each flap arm of each flap to the adjacent lever.

5. A variable area nozzle including a duct having an outlet, a ring surrounding said duct adjacent to the outlet, a plurality of flaps pivotally mounted on said ring around said fluid outlet, each of said flaps having an arm projecting therefrom, a bell crank lever for each flap pivoted on said fixed ring, a link connecting each flap arm to one end of the adjacent bell crank lever and links connecting the other ends of adjacent bell crank levers together.

6. A variable area nozzle including a duct having an outlet, a ring surrounding said duct adjacent to the outlet, a plurality of flaps pivotally mounted on said ring around said fluid outlet, said ring having a sealing portion, said flaps each having a part engaging with said sealing portion to form a seal, each of said flaps having an arm projecting therefrom, a bell crank lever for each flap pivoted on said fixed ring, a link connecting each arm of each flap to one end of its bell crank lever, and links connecting the other ends of said bell crank levers to each other.

7. A variable area nozzle including a duct having an outlet, a ring surrounding said duct adjacent to the outlet, a plurality of flaps pivotally mounted on said ring around said fluid outlet, each of said flaps having an arm projecting therefrom, a bell crank lever for each flap pivoted at an angle on said fixed ring, a link connecting each flap arm to one end of the adjacent bell crank lever and links connecting the other ends of adjacent bell crank levers together.

8. A combination with a duct having a fluid outlet of a nozzle for controlling the effective area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, a bell crank lever for each flap pivoted on said flat ring, a link connecting each flap to one end of its adjacent bell crank lever, and links connecting the other ends of adjacent bell crank levers together.

9. A combination with a duct having a fluid outlet of a nozzle for controlling the effective area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, a bell crank lever for each flap pivoted on said flat ring, a link connecting each flap arm to one end of its adjacent bell crank lever, each link being connected to said flap arm and to its end of the adjacent bell crank lever by a self-aligning bearing, and links connecting the other ends of adjacent bell crank levers together.

10. A combination with a duct having a fluid outlet of a nozzle for controlling the effective area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, each arm having a clevis at its free end, a bell crank lever for each flap pivoted on said flat ring, each lever of said bell crank lever having two free ends spaced apart, a link connecting each flap arm to one end of its adjacent bell crank lever, each link being connected to the clevis of said flap arm and to its end of the adjacent bell crank lever by a self-aligning bearing, and links connecting the other ends of adjacent bell crank levers together.

11. A combination with a duct having a fluid outlet of a nozzle for controlling the effective area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, a bell crank lever for each flap pivoted on said flat ring, a link connecting each flap onto one end of its adjacent bell crank lever and links connecting the other ends of adjacent bell crank levers together, one of said bell crank levers having a link connecting it to a flap being longer than the other levers, and means connected to said longer lever to actuate said nozzle.

12. A combination with a duct having a fluid outlet of a nozzle for controlling the effective area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, a bell crank lever for each flap pivoted on said flat ring, a link connecting each flap arm to one end of its adjacent bell crank lever, each link being connected to said flap arm and to its end of the adjacent bell crank lever by a self-aligning bearing, links connecting the other ends of adjacent bell crank levers together, one of said bell crank levers having a link connecting it to a flap being longer than the other levers, and means connected to said longer lever to actuate said nozzle.

13. A combination with a duct having a fluid outlet of a nozzle for controlling the effctive area of the outlet including a flat ring surrounding said duct adjacent to the outlet, two radially extending rings fixed to said duct, said flat ring being fixed to the outer ends of said two radially extending rings, a mounting ring mounted in fixed relation to said duct, a plurality of flaps pivotally mounted on said mounting ring around said fluid outlet, each of said flaps having an arm projecting therefrom, each arm having a clevis at its free end, a bell crank lever for each flap pivoted on said flat ring, each lever of said bell crank lever having two free ends spaced apart, a link connecting each flap arm to one end of its adjacent bell crank lever, each link being connected to the clevis of said flap arm and to its end of the adjacent bell crank lever by a self-aligning bearing, links connecting the other ends of adjacent bell crank levers together, one of said bell crank levers having a link connecting it to a flap being longer than the other levers, and means connected to said longer lever to actuate said nozzle.

References Cited in the file of this patent
UNITED STATES PATENTS

| | | |
|---|---|---|
| 2,395,809 | Goddard | Mar. 5, 1946 |
| 2,569,497 | Schiesel | Oct. 2, 1951 |
| 2,608,820 | Berliner | Sept. 2, 1952 |
| 2,667,226 | Doblhoff | Jan. 26, 1954 |
| 2,682,147 | Ferris | June 29, 1954 |